United States Patent
Surnilla et al.

(10) Patent No.: US 9,995,234 B2
(45) Date of Patent: Jun. 12, 2018

(54) METHODS AND SYSTEMS FOR ENGINE FUEL AND TORQUE CONTROL

(71) Applicant: Ford Global Technologies, LLC, Dearborn, MI (US)

(72) Inventors: Gopichandra Surnilla, West Bloomfield, MI (US); James Alfred Hilditch, Canton, MI (US); Ross Dykstra Pursifull, Dearborn, MI (US); Michael McQuillen, Warren, MI (US); Martin Brown, Dearborn, MI (US); Imtiaz Ali, Lathrup Village, MI (US); Naginder Gogna, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 15/075,875

(22) Filed: Mar. 21, 2016

(65) Prior Publication Data

US 2017/0268447 A1     Sep. 21, 2017

(51) Int. Cl.
*F02D 41/14* (2006.01)
*F02D 41/26* (2006.01)
(Continued)

(52) U.S. Cl.
CPC ......... *F02D 41/1458* (2013.01); *F02D 41/18* (2013.01); *F02D 41/263* (2013.01); *F02D 2041/281* (2013.01)

(58) Field of Classification Search
CPC .... F02D 41/14; F02D 41/144; F02D 41/1454; F02D 41/1458; F02D 41/18;
(Continued)

(56) References Cited

U.S. PATENT DOCUMENTS 4,052,970 A    10/1977  Niertit et al.
4,212,273 A     7/1980  Maruoka
(Continued)

FOREIGN PATENT DOCUMENTS

DE    19946506 C1      7/2001
WO    2013032844 A1    3/2013

OTHER PUBLICATIONS

Uhrich, Michael James et al., "System and Method for Exhaust Gas Recirculation Estimation With Two Intake Oxygen Sensors," U.S. Appl. No. 14/573,020, filed Dec. 17, 2014, 50 pages.
(Continued)

*Primary Examiner* — John Kwon
*Assistant Examiner* — Johnny H Hoang
(74) *Attorney, Agent, or Firm* — Julia Voutyras; McCoy Russell LLP

(57) ABSTRACT

Methods and systems are provided for accurately estimating intake aircharge based on the output of an intake oxygen sensor while flowing EGR, purge, or PCV hydrocarbons to the engine. The unadjusted aircharge estimate is used for engine fuel control while the hydrocarbon adjusted aircharge estimate is used for engine torque control. A controller is configured to sample the oxygen sensor at even increments in a time domain, stamp the sampled data in a crank angle domain, store the sampled data in a buffer, and then select one or more data samples corresponding to a last firing period from the buffer for estimating the intake aircharge.

5 Claims, 7 Drawing Sheets

(51) Int. Cl.
*F02D 41/18* (2006.01)
*F02D 41/28* (2006.01)

(58) Field of Classification Search
CPC ............. F02D 41/263; F02D 2041/281; Y02T 10/123; Y02T 10/42; Y02T 10/44
USPC ......... 123/299, 300, 445, 472; 701/102–106, 701/108, 114, 115
See application file for complete search history.

(56) References Cited

U.S. PATENT DOCUMENTS

| | | | |
|---|---|---|---|
| 4,359,989 | A | 11/1982 | Masaki et al. |
| 5,505,180 | A | 4/1996 | Otterman et al. |
| 6,089,082 | A | 7/2000 | Kotwicki et al. |
| 6,694,953 | B2 | 2/2004 | Barnes et al. |
| 6,742,379 | B2 | 6/2004 | Matsubara et al. |
| 6,840,228 | B2 | 1/2005 | Yomogida et al. |
| 6,851,304 | B2 | 2/2005 | Cullen et al. |
| 7,210,458 | B2 | 5/2007 | Walther et al. |
| 8,495,996 | B2 | 7/2013 | Soltis et al. |
| 8,857,155 | B2 | 10/2014 | Surnilla et al. |
| 9,273,602 | B2 | 3/2016 | Surnilla et al. |
| 9,328,684 | B2 | 5/2016 | Surnilla et al. |
| 2002/0139360 | A1* | 10/2002 | Sato .................... F02D 41/0037 123/698 |
| 2012/0259529 | A1 | 10/2012 | Matthews |
| 2013/0191008 | A1* | 7/2013 | Surnilla ................ F02D 41/144 701/104 |
| 2014/0288804 | A1* | 9/2014 | Pursifull ............ F02D 41/1454 701/104 |
| 2015/0075502 | A1 | 3/2015 | Surnilla et al. |
| 2015/0101564 | A1 | 4/2015 | Surnilla et al. |
| 2015/0292428 | A1* | 10/2015 | Hakeem ................ F02D 41/144 701/104 |
| 2015/0292429 | A1* | 10/2015 | Surnilla ................ F02D 41/144 701/108 |

OTHER PUBLICATIONS

Makled, Daniel A. et al.,"Methods and Systems for Estimating an Air-Fuel Ratio With a Variable Voltage Oxygen Sensor," U.S. Appl. No. 14/626,542, filed Feb. 19, 2015, 47 pages.

Pursifull, Ross Dykstra et al., "Air Charge Estimation Via Manifold Pressure Sample at Intake Valve Closing," U.S. Appl. No. 14/977,150, filed Dec. 21, 2015, 35 pages.

Pursifull, Ross Dykstra et al., "Methods and Systems for Engine Fuel and Torque Control," U.S. Appl. No. 15/076,212, filed Mar. 21, 2016, 60 pages.

* cited by examiner

METHODS AND SYSTEMS FOR ENGINE FUEL AND TORQUE CONTROL

FIELD

The present description relates generally to an oxygen sensor coupled to an intake passage of an internal combustion engine.

BACKGROUND/SUMMARY

Engines may be configured with an oxygen sensor coupled to an intake passage for determining the oxygen content of fresh intake air. In particular, the sensor measures the partial pressure of oxygen in the aircharge following equilibration. The aircharge amount may be further corrected for the presence of diluents which can react with oxygen at the sensor, thereby affecting the sensor's output. For example, the oxygen sensor output is corrected for the presence of humidity, hydrocarbons from EGR, purge fuel vapors, crankcase ventilation fuel vapors, etc. One example of such an approach is shown by Surnilla et al. in US patent application 20140251285.

The corrected aircharge estimate can then be used for controlling engine fueling. However, the inventors herein have recognized potential issues with such an approach for aircharge estimation. As one example, while the aircharge estimate may be correct for fueling control, it may be incorrect for torque estimation. This is because the diluent hydrocarbons that are corrected for during the aircharge estimation participate in cylinder combustion and therefore contribute towards torque production. Therefore, if the diluent corrected aircharge estimate is used for torque control, it may result in excess torque, affecting drivability. In addition, even small errors in the estimation of the diluents can cause significant errors in engine aircharge estimation, and thereby engine fuel and torque estimation. Another potential issue is that for learning actual (versus nominal) injector delivery requires the other sources of fuel (such as reductants) and diluents to be disabled. Specifically, both the injector learning and aircharge learning requires EGR, purge, and crankcase ventilation to be disabled. As a result, a window for performing adaptive learning, such as adaptive learning of fuel and diagnostics of the oxygen sensor, is limited.

In one example, at least some of the above issues may be addressed by a method for an engine, comprising: while flowing one or more diluents into an engine, adjusting engine fueling responsive to an output of an intake oxygen sensor independent of the diluents, and learning an adaptive fuel correction. In this way, fuel and torque may be estimated more accurately using the intake oxygen sensor. In addition, adaptive fuel learning may be performed without the need to disable EGR, fuel vapor purge, or crankcase ventilation.

As an example, during conditions when the engine is operating with one or more of EGR, purge, or crankcase ventilation enabled, a controller may estimate a net oxygen content of the intake aircharge based on the output of an oxygen sensor coupled to an intake passage of the engine. The net oxygen content may not need to be compensated for the presence of diluents such as the purge or crankcase fuel vapors and the EGR. In particular, the inventors have recognized that a catalyzing oxygen sensor measures the net air concentration that needs a matching amount of fuel. Consequently, the air charge estimation based on the output of the oxygen sensor is insensitive to (and therefore independent of) the presence of diluents in the air. While the unadjusted output of the oxygen sensor is used for fuel control, the oxygen output corrected for the presence of diluents is then used for engine torque control. For example, the oxygen output may be corrected based on an EGR and/or humidity measurement (measured by the oxygen sensor or a dedicated sensor), and an aircharge estimated based on the corrected output may be used for torque control. In addition, while flowing the EGR, purge, or PCV hydrocarbons, adaptive fuel learning may be performed. For example, a fuel injector offset may be learned and/or MAF sensor offsets may be learned.

In this way, the output of an intake oxygen sensor may be used for fuel and torque control. In essence, the oxygen sensor is advantageously used as an intake manifold pressure sensor for aircharge estimation during selected conditions. The technical effect of using the unadjusted output of the oxygen sensor for estimating an aircharge that is used for fuel control is that engine fueling can be accurately controlled independent of diluent presence. In addition, adaptive fuel learning can be performed while EGR, purge, or PCV vapors are flowing, improving the window of adaptive fuel learning. The technical effect of using a diluent adjusted output of the oxygen sensor for estimating an aircharge that is used for torque control is that fuel and torque can each by accurately controlled using the output of the same oxygen sensor. In addition, the output of the intake oxygen sensor may be used to correct or confirm the output of a manifold pressure or engine air flow rate sensor. By enabling adaptive learning to be performed over a wider range of operating conditions, including while fuel vapors are flowing into the engine, adaptive learning can be completed more effectively over a drive cycle. Overall, engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
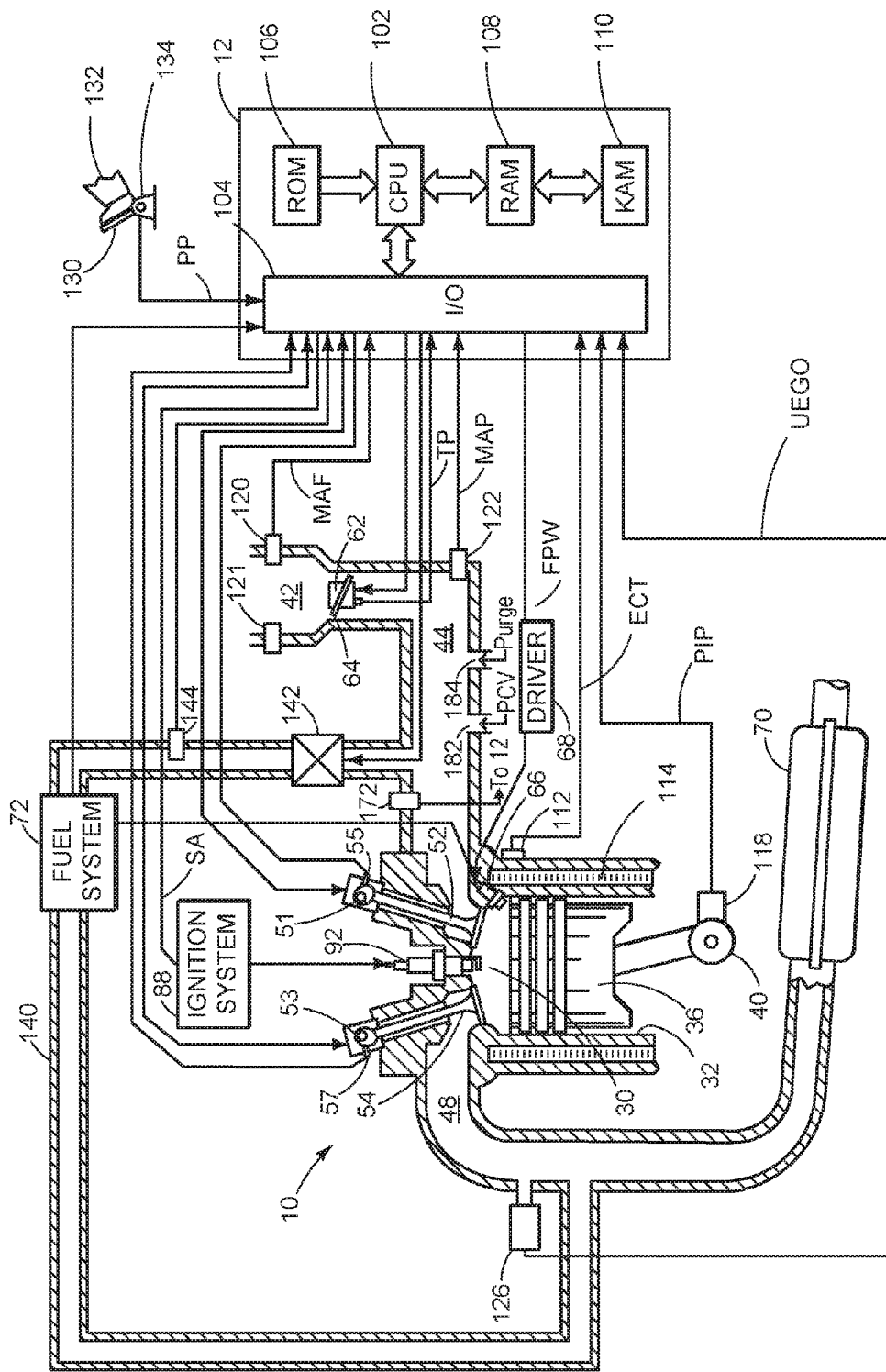
FIG. 1 shows a schematic diagram of an engine system including an intake oxygen sensor (IAO2).
Figure 2:
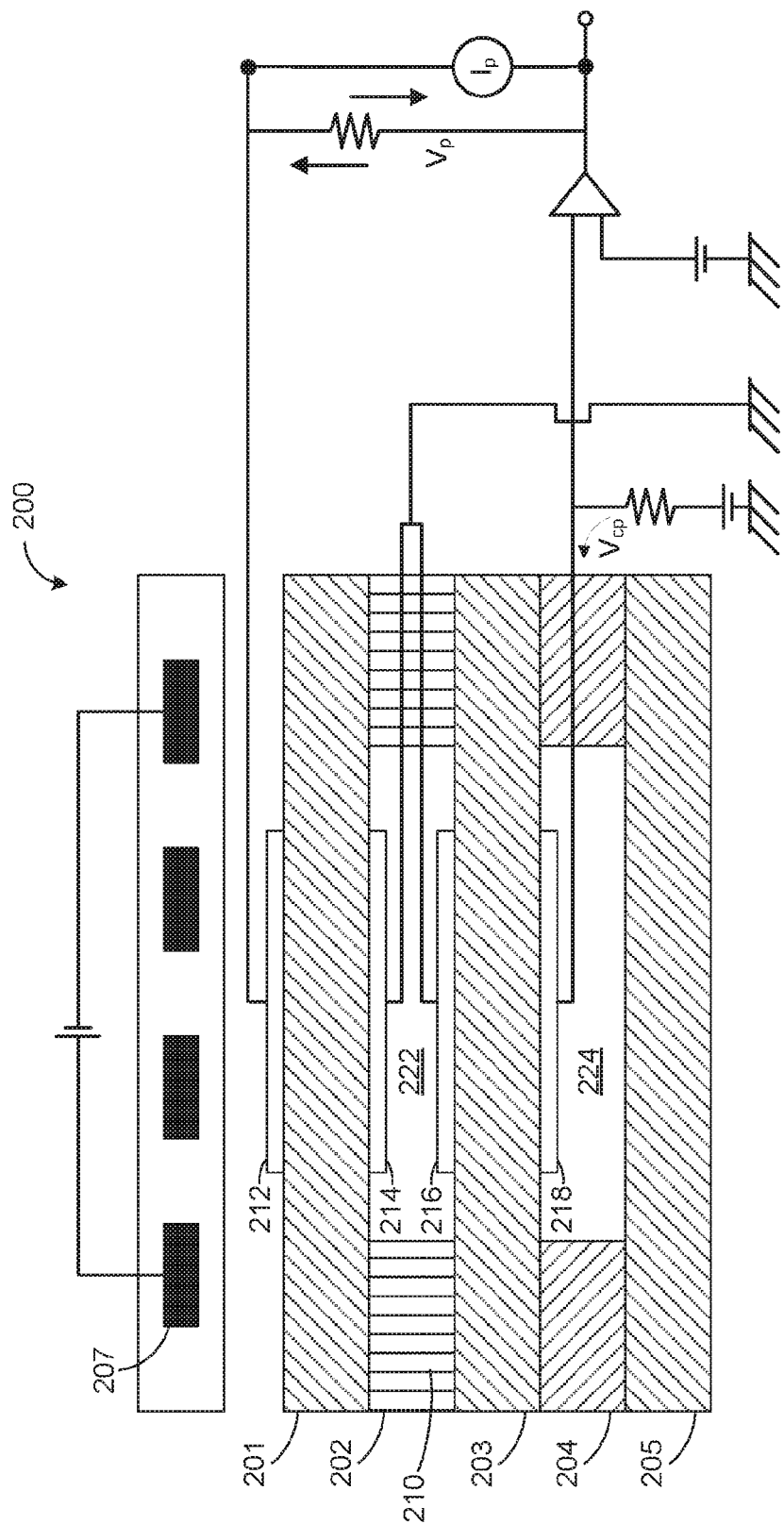
FIG. 2 shows a schematic diagram of an example intake oxygen sensor.
Figure 3:
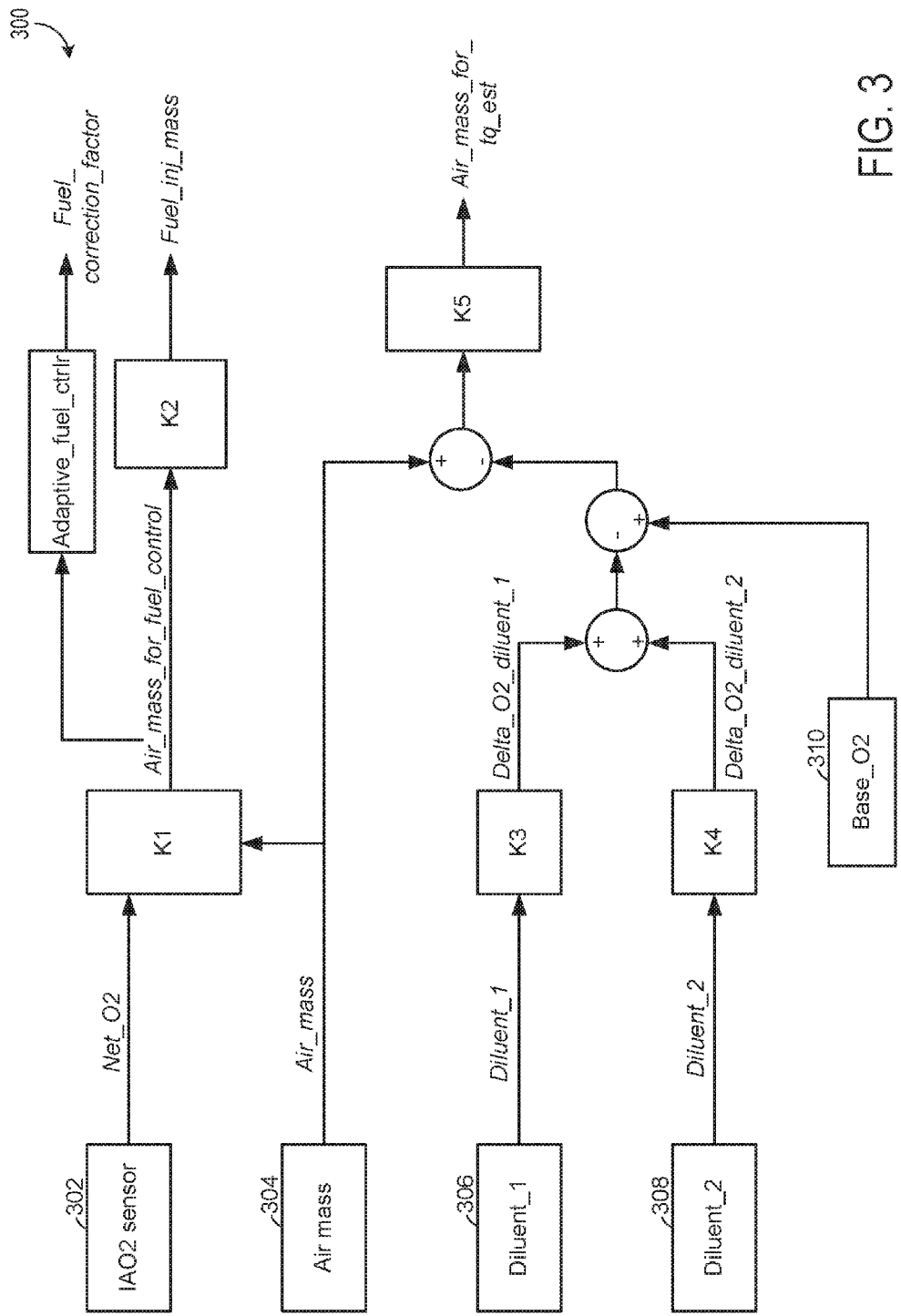
FIG. 3 shows a block diagram for air mass calculation based on an output of the intake oxygen sensor that is used for fuel control and torque estimation.
Figure 4:
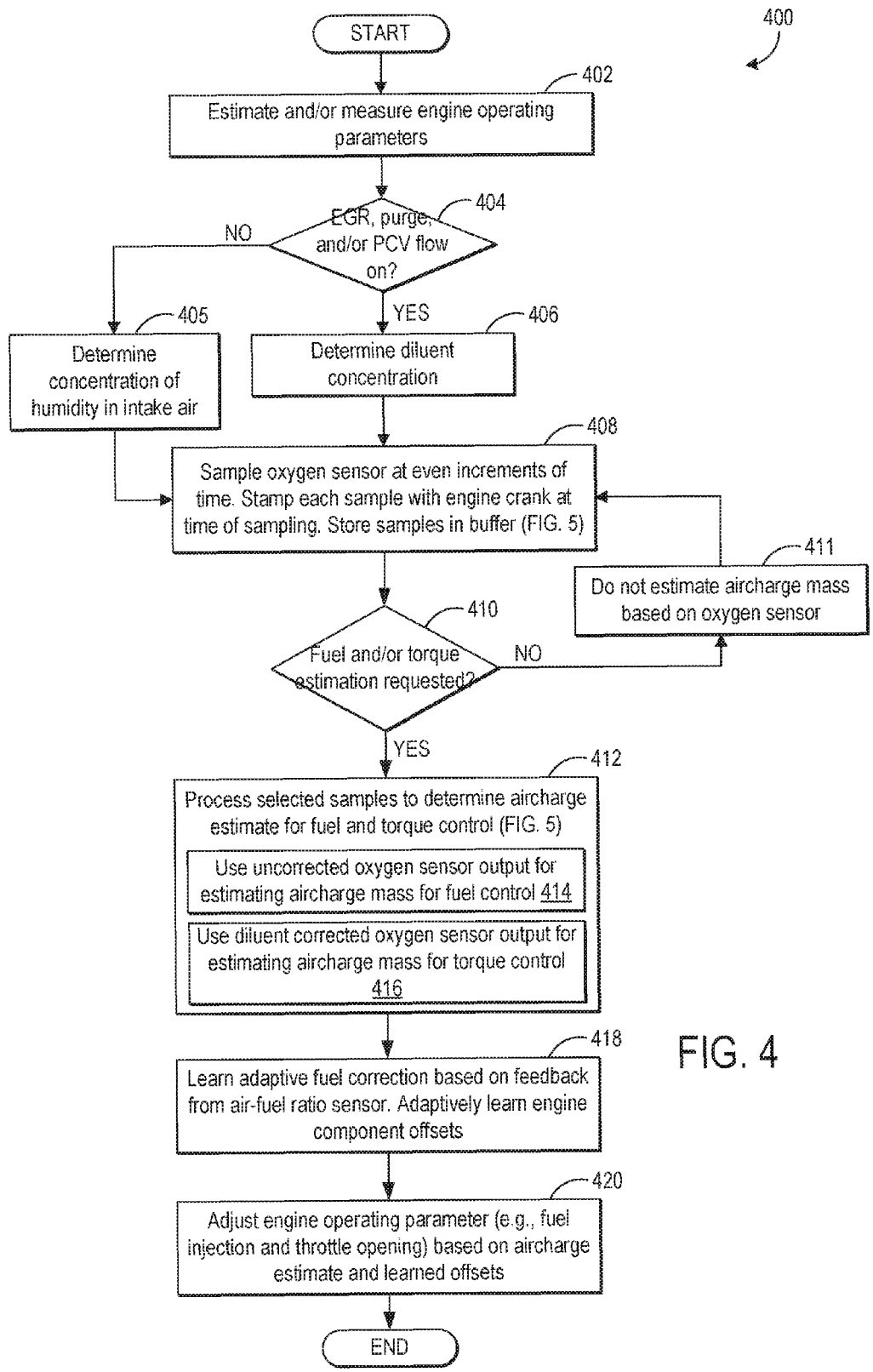
FIG. 4 shows a flow chart of a method for operating the intake oxygen sensor of FIG. 1 for determining aircharge into a cylinder and adjusting an engine operating parameter.
Figure 6:
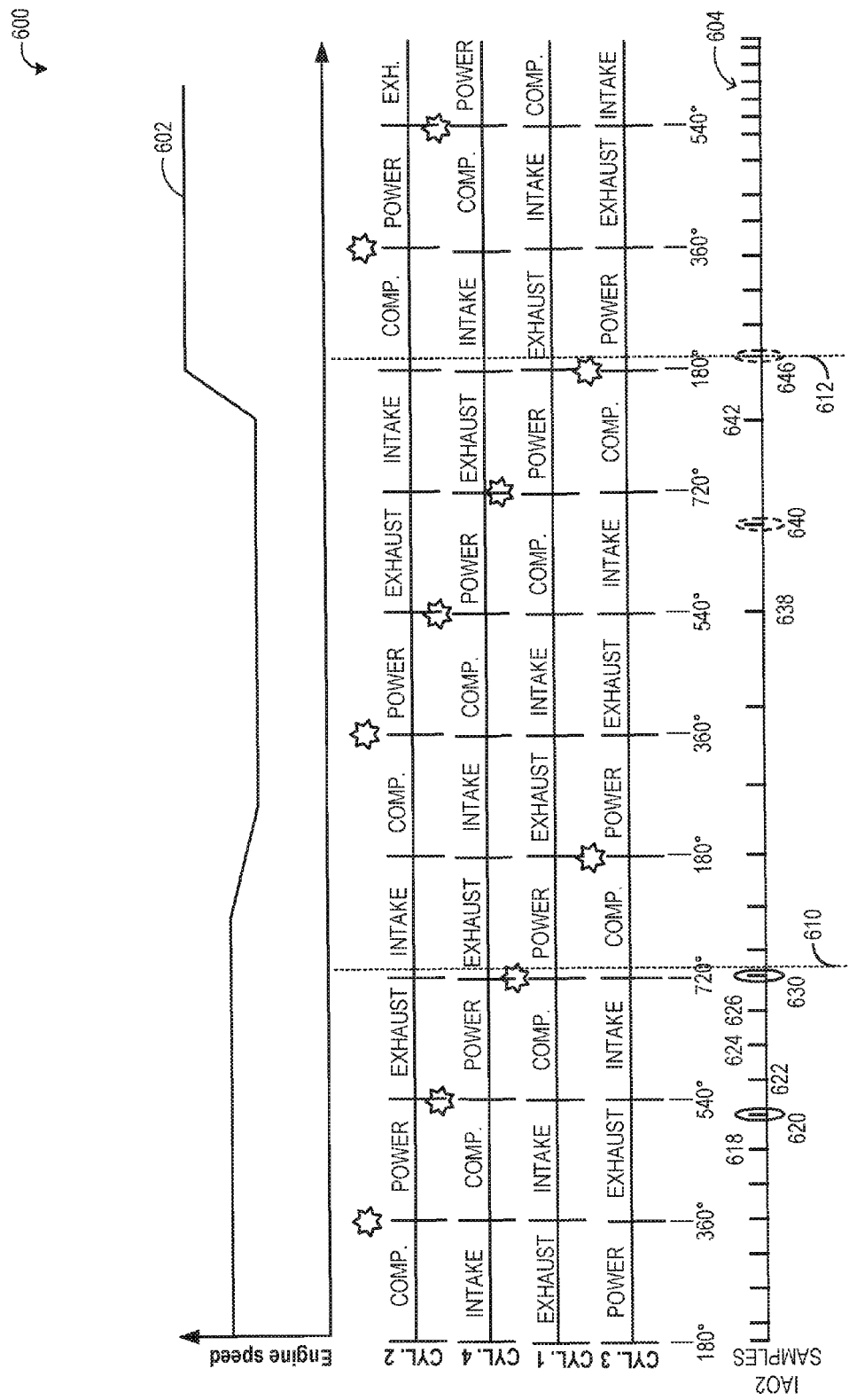
FIG. 6 shows ignition timing diagrams illustrating cylinder events of four individual cylinders, and their corresponding crankshaft angles and IAO2 sensor sampling events by an intake oxygen sensor.
Figure 7:
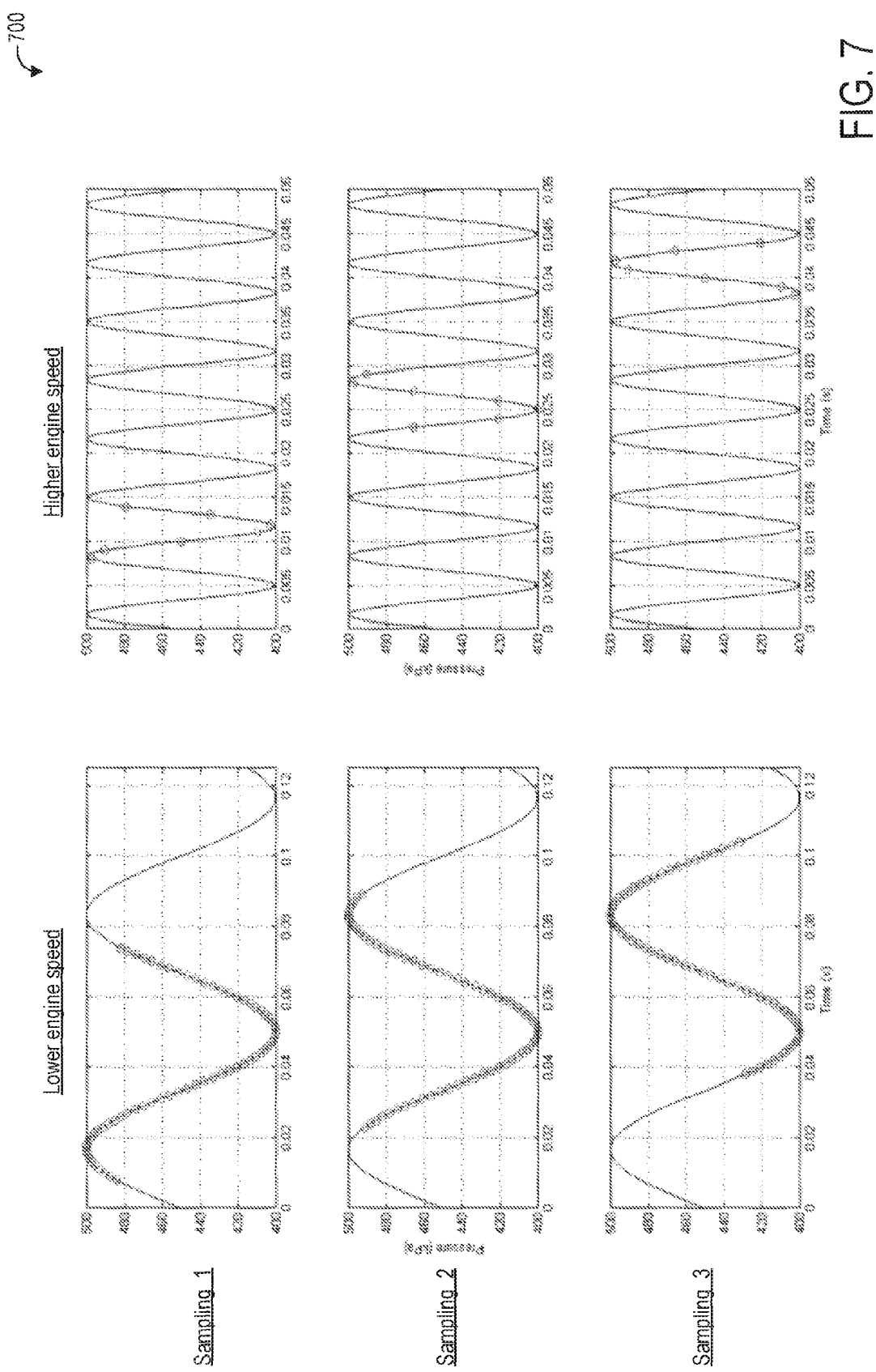
FIG. 7 shows an example of sampling and buffering a sine wave at two different engine speeds.

The following description relates to systems and methods for accurately estimating an intake aircharge in an engine using an oxygen sensor located in an intake passage of the engine, such as the engine system of FIG. 1. An example embodiment of the intake oxygen sensor is shown in FIG. 2. An uncorrected output of the oxygen sensor estimated in the presence of diluent flow (such as in the presence of EGR flow, purge fuel vapor flow, or crankcase fuel vapor flow) may be used to determine a net oxygen content of the intake aircharge, and used for fuel and torque control (FIGS. 3-4). A controller may be configured to sample the oxygen sensor output at even increments of time (e.g., 1 millisecond time increments) and angle-stamp the samples. These crankshaft angle-stamped oxygen sensor signal samples may be buffered and a subset of the buffered samples may be accessed during engine operation for the purpose of determining an aircharge into a cylinder and subsequently adjusting operating parameters of said engine. As elaborated with reference to FIG. 5, samples having an angle stamp corresponding to a last firing period may be retrieved and averaged during a current firing period for use in engine fuel and torque control. The sampling schedule (FIG. 6) of the sensor is pre-specified at even time intervals, and once each sample has been angle-stamped, the information is stored in a buffer accessible to the controller. An example comparison of sampling and buffering of sensor output at higher and lower engine speeds is shown at FIG. 7. In this way, signal processing time is reduced without reducing the accuracy of the result.

Referring now to FIG. 1, a schematic diagram showing one cylinder of multi-cylinder engine 10, which may be included in a propulsion system of an automobile, is illustrated. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate embodiment, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Fuel tank in fuel system 72 may hold fuels with different fuel qualities, such as different fuel compositions. These differences may include different alcohol content, different octane, different heats of vaporization, different fuel blends, and/or combinations thereof etc. As an example, the engine may use an alcohol containing fuel blend such as E85 (which is approximately 85% ethanol and 15% gasoline) or M85 (which is approximately 85% methanol and 15% gasoline). Alternatively, the engine may operate with other ratios of gasoline and ethanol stored in the tank, including 100% gasoline and 100% ethanol, and variable ratios there-between, depending on the alcohol content of fuel supplied by the operator to the tank. Moreover, fuel characteristics of the fuel tank may vary frequently. In one example, a driver may refill the fuel tank with E85 one day, and E10 the next, and E50 the next. As such, based on the level and composition of the fuel remaining in the tank at the time of refilling, the fuel tank composition may change dynamically.

In another example, the fuel system may include a first fuel tank for storing a first, liquid fuel, such as a gasoline fuel or a diesel fuel, and a second fuel tank for storing a second gaseous fuel, such as compressed natural gas (CNG). In such an example, the first fuel may be coupled to the direct injector and delivered to the cylinder via direct injection while the second fuel may be coupled to the port injector and delivered to the cylinder via port injection. Herein, it will be appreciated that the second gaseous fuel may be stored in the fuel tank under pressure, in a liquid form, and delivered to a fuel rail also in the liquid form, the fuel being converted into the gaseous form in the cylinder.

It will be appreciated that while in one embodiment, the engine may be operated by injecting the variable fuel blend via a direct injector, in alternate embodiments, the engine may be operated by using two injectors and varying a relative amount of injection from each injector. It will be further appreciated that when operating the engine with a boost from a boosting device such as a turbocharger or supercharger (not shown), the boosting limit may be increased as an alcohol content of the variable fuel blend is increased.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12. In one embodiment, the intake passage 42 may additionally include a humidity sensor 121 for measuring ambient humidity. In another embodiment, the humidity sensor 121 may additionally or alternatively be placed in the exhaust passage 48.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 (e.g., exhaust oxygen sensor) is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. The sensor may also be operated in a variable voltage mode during non-fueling conditions for estimating a humidity content of ambient air received in the engine.

Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Further, in the disclosed embodiments, an exhaust gas recirculation (EGR) system may route a desired portion of exhaust gas from exhaust passage 48 to intake passage 44 via EGR passage 140. The amount of EGR provided to intake passage 44 may be varied by controller 12 via EGR valve 142. An EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

A linear oxygen sensor (herein also referred to as an intake oxygen sensor) 172 may be positioned at the intake passage, downstream of the intake throttle. Intake oxygen sensor 172 may be used to facilitate EGR regulation. In addition, the intake oxygen sensor may be used to estimate an oxygen content of ambient air received in the intake passage. The sensor measures the net oxygen in the intake air and may be used to determine the oxygen flow rate into the engine cylinders. The sensor may also be operated in a variable reference voltage mode during non-fueling conditions for estimating a humidity content of ambient air received in the intake passage. Further, as elaborated herein, the output of the intake oxygen sensor may be used for aircharge estimation independent of the presence of diluents. This (unadjusted) aircharge estimate can then be used for engine fuel control since the net aircharge estimated by the sensor corresponds to the amount of air that has to be accounted for fueling. In comparison, a diluent adjusted aircharge estimate is used for engine torque control since the diluents hydrocarbons combust in the cylinder and contribute to torque production. In essence, by adjusting engine fueling based on the adjusted output of the oxygen sensor, the oxygen sensor can be advantageously used as a manifold pressure (MAP) sensor. In some examples, the output of an engine MAP sensor can be confirmed or corrected based on the aircharge estimate determined by the oxygen sensor.

A PCV port 182 may be configured to deliver crankcase ventilation gases (blow-by gases) to the engine intake manifold, downstream of intake throttle 62. In some embodiments, flow of positive crankcase ventilation (PCV, which includes air and crankcase gasses) through PCV port 182 may be controlled by a dedicated PCV port valve. Likewise, a purge port 184 may be configured to deliver purge gases from a fuel system canister to the engine intake manifold along passage 44. In some embodiments, flow of purge gases (which includes air and canister purge fuel vapors) through purge port 184 may be controlled by a dedicated purge port valve (a.k.a. canister purge valve). Since purge and PCV gases are supplied directly to the intake manifold, and since the purge and PCV gases are received upstream of intake oxygen sensor 172, they therefore affect the output of the sensor. That is, the sensor measures the oxygen concentration in the air with the diluents in place. Since the diluents displace the oxygen, they reduce the oxygen concentration in the air. In particular, fuel hydrocarbons such as purge fuel vapors are measured by the oxygen sensor by first combusting/catalyzing the hydrocarbons on the sensor. By catalyzing the hydrocarbons on the sensor, the intake oxygen sensor 172 measures the net oxygen in the air. In other words, the sensor only measures the oxygen concentration in the air if all the fuel hydrocarbons were combusted.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP.

Storage medium read-only memory 106 can be programmed with computer readable data representing instructions executable by processor 102 for performing the methods described below as well as other variants that are anticipated but not specifically listed. Example methods are described with reference to FIGS. 4-5.

As described above, FIG. 1 shows only one cylinder of a multi-cylinder engine, and each cylinder may similarly include its own set of intake/exhaust valves, fuel injector, spark plug, etc.

Next, FIG. 2 shows a schematic view of an example embodiment of an oxygen sensor 200 configured to measure a concentration of oxygen (02) in an intake gas stream. Sensor 200 may operate as intake oxygen sensor 172 of FIG. 1, for example. Sensor 200 comprises a plurality of layers of one or more ceramic materials arranged in a stacked configuration. In the embodiment of FIG. 2, five ceramic layers are depicted as layers 201, 202, 203, 204, and 205. These layers include one or more layers of a solid electrolyte capable of conducting ionic oxygen. Examples of suitable solid electrolytes include, but are not limited to, zirconium oxide-based materials. Further, in some embodiments, a heater 207 may be disposed in thermal communication with the layers to increase the ionic conductivity of the layers. While the depicted oxygen sensor is formed from five ceramic layers, it will be appreciated that the oxygen sensor may include other suitable numbers of ceramic layers.

Layer 202 includes a material or materials creating a diffusion path 210. Diffusion path 210 is configured to introduce exhaust gases into a first internal cavity 222 via diffusion. Diffusion path 210 may be configured to allow one or more components of exhaust gases, including but not limited to a desired analyte (e.g., O2), to diffuse into internal cavity 222 at a more limiting rate than the analyte can be pumped in or out by pumping electrodes pair 212 and 214. In this manner, a stoichiometric level of O2 may be obtained in the first internal cavity 222.

Sensor 200 further includes a second internal cavity 224 within layer 204 separated from the first internal cavity 222 by layer 203. The second internal cavity 224 is configured to maintain a constant oxygen partial pressure equivalent to a stoichiometric condition, e.g., an oxygen level present in the second internal cavity 224 is equal to that which the exhaust gas would have if the air-fuel ratio was stoichiometric. A stoichiometric level is detected by the cell's output voltage. The oxygen concentration in the second internal cavity 224 is held constant by pumping voltage Vp. Herein, second internal cavity 224 may be referred to as a reference cell. The pumping current is proportional to the relative fuel air ratio which is proportional to the partial pressure of oxygen.

A pair of sensing electrodes 216 and 218 is disposed in communication with first internal cavity 222 and reference cell 224. The sensing electrodes pair 216 and 218 detects a concentration gradient that may develop between the first internal cavity 222 and the reference cell 224 due to an oxygen concentration in the exhaust gas that is higher than or lower than the stoichiometric level. A high oxygen concentration may be caused by a lean exhaust gas mixture, while a low oxygen concentration may be caused by a rich mixture.

A pair of pumping electrodes 212 and 214 is disposed in communication with internal cavity 222, and is configured to electrochemically pump a selected gas constituent (e.g., O$_2$) from internal cavity 222 through layer 201 and out of sensor 200. Alternatively, the pair of pumping electrodes 212 and 214 may be configured to electrochemically pump a selected gas through layer 201 and into internal cavity 222. Herein, pumping electrodes pair 212 and 214 may be referred to as an O$_2$ pumping cell.

Electrodes 212, 214, 216, and 218 may be made of various suitable materials. In some embodiments, electrodes 212, 214, 216, and 218 may be at least partially made of a material that catalyzes the dissociation of molecular oxygen. Examples of such materials include, but are not limited to, electrodes containing platinum and/or silver.

The process of electrochemically pumping the oxygen out of or into internal cavity 222 includes applying a voltage Vp (e.g., reference voltage) across pumping electrode pair 212 and 214. The pumping voltage Vp applied to the O2 pumping cell pumps oxygen into or out of first internal cavity 222 in order to maintain a stoichiometric level of oxygen in the cavity pumping cell. The resulting pumping current Ip is proportional to the concentration of oxygen in the assessed charge (exhaust gas when the sensor is an exhaust gas sensor, intake air when the sensor is an intake oxygen sensor). A control system (not shown in FIG. 2) generates the pumping current signal Ip as a function of the intensity of the applied pumping voltage Vp required to maintain a stoichiometric level within the first internal cavity 222. Thus, a lean mixture will cause oxygen to be pumped out of internal cavity 222 and a rich mixture will cause oxygen to be pumped into internal cavity 222.

It should be appreciated that the oxygen sensor described herein is merely an example embodiment of an intake oxygen sensor, and that other embodiments of intake oxygen sensors may have additional and/or alternative features and/or designs.

Further, the oxygen sensor of FIG. 2 may be operable as a variable voltage oxygen sensor configured to operate at a first, lower voltage (e.g., first reference voltage) where water molecules are not dissociated and a second, higher voltage (e.g., second reference voltage) where water molecules are fully dissociated. As such, the second voltage is higher than the first voltage.

As elaborated below, the oxygen sensor of FIG. 2 can be advantageously used for fueling and torque control. In particular, the oxygen sensor may be used for estimating the net oxygen content of the aircharge without needing to compensate for diluents such as humidity, EGR, purge and PCV hydrocarbons. This allows the oxygen sensor output to be used for aircharge estimation directly over a wider range of engine operating conditions, including conditions when EGR is flowing, PCV vapors are flowing, and/or while purge is being carried out. By not requiring the diluent concentration to be corrected for in the fueling control, errors in fueling due to errors in diluent fuel estimation are reduced, and fueling accuracy is improved. In addition, adaptive fuel learning (such as learning of fuel injector offsets) can also be performed concurrently. Since this allows the net oxygen flow rate into the cylinders to be determined, the oxygen sensor can essentially be used as a MAP sensor. In addition, the oxygen concentration determined based on the oxygen sensor output may be used to confirm, correct, or replace a manifold aircharge pressure determined via a dedicated engine MAP sensor (such as sensor 122 of FIG. 1).

The following is true when fuel vapor purge and crankcase ventilation are off:

$$IAO2\_based\_MAP = IAO2\_sensed\_oxygen\_partial\_pressure/21\ kPa,$$

wherein IAO2_based_MAP is the manifold aircharge pressure or oxygen concentration determined based on the oxygen sensor output, and IAO2_sensed_oxygen_partial_pressure is the unadjusted output of the oxygen sensor.

The intake oxygen sensor (e.g., intake oxygen sensor of FIG. 2 and/or linear oxygen sensor 172 of FIG. 1) also operate as a traditional oxygen sensor at a lower, first reference voltage (e.g., approximately 450 mV). This lower voltage may be referred to herein as the base reference voltage. Said another way, the linear oxygen sensor may be operated as oxygen sensor in order to determine a combustion air-fuel ratio.

Further still, intake oxygen sensor may be operated to provide an ambient humidity estimate by being operated in a variable voltage (VVs) mode. When operating in the VVs mode, a reference voltage of the oxygen sensor is increased from a lower, base voltage (e.g., approximately 450 my, also referred to herein as nominal conditions) to a higher, target voltage (e.g., in a range of 900-1100 mV). In some examples, the higher, target voltage may be a voltage at which water molecules are partially or fully dissociated at the oxygen sensor while the base voltage is a voltage at which water molecules are not dissociated at the sensor.

Turning now to FIG. 3, block diagram 300 shows a schematic representation of air mass calculation via an intake oxygen sensor for fuel control and torque estimation. As such, the figure is an alternate depiction of the routine of FIG. 3. The inventors herein have recognized that an aircharge estimated based on the net oxygen measured by the intake oxygen sensor is correct for fueling control. However, the estimate has the effects of diluents and fuel hydrocarbons which participate in combustion in the cylinder, and thereby produce torque. Consequently, the (unadjusted) aircharge estimate is not accurate for torque estimation. To overcome these issues, the net intake oxygen based aircharge is used for fuel control. Then, the change in oxygen due to diluents in corrected for from the air mass, and the corrected value is used for torque control, as described below. It will be appreciated that the routine of FIG. 3 may be performed while diluents are flowing into the engine intake, such as while one or more of exhaust gas recirculation (EGR), purge fuel vapors (herein also referred to as purge flow), and positive crankcase ventilation fuel vapors (herein also referred to as PCV flow) are enabled.

At 302, the output from an intake oxygen sensor (IAO2) coupled to an intake passage of the engine is received. As such, this is the unadjusted output of the intake oxygen sensor which reflects a net oxygen content of the intake air (Net_O2). In one example, the output of the intake oxygen sensor includes a pumping current that is output upon application of a reference voltage to the sensor. The reference voltage is a voltage where water molecules do not dissociate at the sensor, such as 450 mV. The sensor output is fed to a controller K1 that calculates air mass for fuel control using the unadjusted sensor output. In particular, the net oxygen measurement by the IAO2 is used to determine the equivalent aircharge with the standard oxygen concentration (Std_O2=20.92%). Controller K1 may also receive input regarding air mass 304 (Air_mass) from a sensor, such as an air mass flow rate from a MAF sensor. The controller K1 may then calculate the air mass for fuel control (cylinder_Air_mass_for_fuel_control) as:

Cylinder_air_mass_for_fuel_control=cylinder_Air_mass*(Net_O2/Std_O2).

The calculated air mass for fuel control may then be input into controller K2 for determination of a fuel injection mass (fuel_inj_mass). In particular, the fuel injection mass for engine fuel control may be calculated to provide a nominal air-fuel ratio (nominal_afr_of_fuel, for example, stoichiometry). The fuel injection may be determined as:

fuel_inj_mass=cylinder_Air_mass_for_fuel_control/nominal_afr_of_fuel.

In this way, engine fueling is adjusted independent of the diluents, based on the unadjusted output of the intake oxygen sensor. In one example, this constitutes the feed-forward portion of engine fuel control. Controller K2 may further receive feedback information regarding fueling errors based on adaptive fuel learning. For example, based on feedback from an exhaust air-fuel ratio sensor, the controller may learn an error, that is assigned to injection error (a.k.a. fuel metering error). The fuel injection mass may then be updated based on the learned error. In other words, the controller estimates a cylinder aircharge based on an output of the intake oxygen sensor, without correcting for the presence of diluents, and then estimates engine fueling based on the estimated aircharge. As such the fueling errors learned with the disclosed approach contains the errors in fueling due to fuel injector flow errors and errors associated with the calculation of the aircharge with N-density methods or MAF-sensor methods. However, the fueling errors associated with errors contributed by diluents such as humidity and EGR, and errors associated with hydrocarbons such as PCV fuel and purge fuel are not included. These diluent and hydrocarbon errors are eliminated by relying on the intake oxygen sensor.

The controller may also learn an adaptive fuel correction while flowing the diluents based on the output of an exhaust gas oxygen sensor coupled to an exhaust passage of the engine. In particular, the calculated cylinder air mass for fuel control (that is output by controller K1) may be input into an adaptive fuel controller (Adaptive_fuel_ctrlr) that generates a fuel correction factor (Fuel_correction_factor) in accordance. Thus, the adaptive learning results in a learned function (such as a table, vector, or scalar) that corrects errors in air charge estimation or fuel metering. In one example, the learned function is a multiplier. In another example, the learned function is an addend. In prior adaptive learning approaches, it has been difficult to separate the two errors and for the sake of convenience, prior approaches have tended to assign the error to the fuel metering side. Since the intake air oxygen sensor reports net partial pressure of oxygen, an air charge estimate based on this enables accurate estimation of adaptive fuel since the sensor output becomes insensitive to crankcase ventilation flow rate or fuel vapor purge rate. In particular, since the hydrocarbons coming from the purge system are accurately measured by the intake oxygen sensor, and the net oxygen going into the engine is measured, the adaptive fuel strategy can be run even with purge flowing.

In one example, the fuel correction may be learned adaptively based on a difference between an expected change in air-fuel ratio due to a pulse-width commanded to the fuel injector and a measured change in air-fuel ratio estimated by the exhaust gas sensor. Herein, the engine fueling amount is adjusted based on the output of the intake oxygen sensor. The controller may then adjust a commanded fuel injector pulse-width based on the determined fuel injection amount. As such, this constitutes the engine fuel control part of routine 300.

It will be appreciated that in addition to learning the adaptive fuel correction, the controller may also learn an offset of one or more engine components while flowing the one or more diluents to the engine. These may include, for example, an offset for an intake manifold airflow sensor, such as the sensor used for estimating Air_mass. If learned, Air_mass 304 may be corrected based on the learned offset before the corrected Air_mass is input to controller K1 (and K5, as detailed below).

Moving on to the torque control part of routine 300, a change in oxygen content due to each diluent present in the intake air is first determined. In the present example, two diluents 306, 308 are depicted, however, it will be appreciated that multiple additional diluents may be similarly processed. In one example, the first diluent includes EGR, and a concentration of the first diluent (Diluent_1) is measured using a differential pressure sensor using DPFE or DPOV methods. In another example, the second diluent includes humidity and a concentration of the second diluent (Diluent_2) is measured using a dedicated humidity sensor, or via an exhaust gas oxygen sensor operating in a variable voltage mode. It will be appreciated that other diluents may be present and they may be measured using appropriate methods.

The concentrations of each diluent are estimated and input to a controller (controllers K3 and K4) for estimation of a change in oxygen in intake air due to diluents (Delta_O2_diluent_1 and Delta_O2_diluent_2). For example, the concentration of the first diluent Diluent_1 is input to controller K3 for estimating Delta_O2_diluent_1 while the concentration of the second diluent Diluent_2 is input to controller K4 for estimating Delta_O2_diluent_2. The change in oxygen concentrations due to each diluent may be determined as:

Delta_O2_diluent_1=Diluent_1_concentation*diluent_1_to_O2_factor and

Delta_O2_diluent_2_concentration=Diluent_2*diluent_2_to_O2_factor, wherein diluent_1_to_O2_factor and diluent_2_to_O2_factor is determined as/defined as the molar percent of oxygen per mole of diluent for each of diluent_1 and diluent_2. The change in oxygen content from each diluent is then summed and compared to the base oxygen content of the dry air (Base_O2). The difference is then input to controller K5 for determination of an air mass for torque estimation. The result is an estimation of the full air mass less the stuff that is not air. Controller K5 determines the cylinder air mass for torque estimation (cylinder_Air_mass_for_tq_est) based on the combined diluent effect and further based on the air mass (or air mass flow rate, Air_mass) as estimated by a MAF sensor at 304. In particular, the controller corrects the output of the intake oxygen sensor for the presence of the diluents by reducing the output of the intake oxygen sensor based on diluent concentration (as estimated by the diluent sensors). Controller K5 may then determine the air mass for torque estimation as:

Cylinder_Air_mass_for_tq_est=cylinder_Air_mass−O2_diluent_1_mass−O2_diluent_2_mass After correcting the output of the intake oxygen sensor for the diluents, the controller may adjust an engine actuator based on a cylinder torque estimated responsive to the corrected (aircharge) output. For example, the controller may adjust an intake throttle coupled to an intake passage of the engine based on the determined air mass for torque estimation to enable engine torque control. In another example, the controller may adjust the position of an EGR valve coupled to the EGR passage to enable torque control. In still other examples, the controller may adjust spark ignition timing and/or a transmission gear shift schedule. Further still, an amount of water injection may be adjusted for the diluents.

In other words, following oxygen estimation by an intake oxygen sensor, the partial pressure of oxygen after equilibration is used for air-fuel ratio control while the partial pressure of oxygen before equilibration is used for torque estimation. Applicant's approach addresses how to adjust the "after equilibration" estimate to determine the "before equilibration" estimate.

In this way, while flowing one or more diluents into an engine, an engine controlling may adjust engine fueling responsive to an output of an intake oxygen sensor independent of the diluents and learn an adaptive fuel correction. By using the unadjusted output of the oxygen sensor for engine fueling control the intake oxygen sensor can be used to estimate the aircharge correctly for the function of fuel control. At the same time, by using the diluent adjusted output of the oxygen sensor for engine torque control, aircharge may be determined for torque estimation while removing the effect of fuel hydrocarbons. As such, this increases torque accuracy which improves vehicle drivability, transmission shift scheduling, and torque control during transmission gear shifts.

It will be appreciated that if the intake oxygen sensor were a non-catalyzing oxygen sensor, the sensor output would read the partial pressure of oxygen (and any oxidant) before equilibration. Therein, the sensor output would yield the correct aircharge estimate for torque calculation.

Turning now to FIG. 4, an example method 400 is shown for operating an intake oxygen sensor for accurate engine fuel and torque control even in the presence of diluent flow. The method allows intake aircharge to be estimated reliably over a wider range of operating conditions, without requiring purge, PCV, or EGR flow to disabled. In addition, adaptive learning of component offsets can be performed concurrently.

At 402, the method includes estimating and/or measuring engine operating parameters such as engine speed, MAP, MAF, barometric pressure, engine temperature, exhaust temperature, EGR, etc. At 404, it may be determined if there is any diluent flow into the intake manifold. In particular, it may be determined if one or more of EGR is flowing, purge fuel vapors are flowing, and crankcase ventilation fuel vapors are flowing into the intake passage. As such, method 400 allows for accurate aircharge estimation even with any diluent hydrocarbon flow into the engine intake. In one example, EGR may be flowing at low to medium engine speed/load conditions to improve fuel economy and reduce NOx emissions. As another example, purge fuel vapors may be flowing to the intake in response to engine load being higher than a threshold and a fuel system canister being full. As yet another example, crankcase ventilation fuel vapors may be flowing to the intake during engine operation opportunistically.

If diluent flow is confirmed, then at 406, a diluent concentration is determined. For example, if EGR is flowing, an EGR concentration (or EGR air-fuel ratio) may be determined via an EGR sensor configured as a differential pressure sensor (such as via DPOV or DPFE methods). As another example, if purge or PCV vapors are flowing, a diluent concentration may be estimated via changes to an exhaust air-fuel ratio sensor (e.g., changes from a nominal air-fuel ratio).

Upon determining the diluent concentration, the method moves to 408. If no diluent flow was confirmed at 404, the method moves to 405 to determine the concentration of humidity in the intake air. In one example, the intake air humidity is estimated based on the output of a humidity sensor. In another example, the intake air humidity may have been previously estimated based on the output of the intake air oxygen sensor operating in a variable voltage mode during non-fueling conditions. The method then moves to 408.

At 408, the method includes estimating an oxygen content of intake air via the intake air oxygen sensor. Specifically, the controller may sample the oxygen sensor output at even increments of time and stamp each sample with an engine crank angle at the time of sampling. The samples may then be stored in a buffer. Details regarding the time-based sampling, crank angle-based stamping, and buffering of oxygen sensor samples are further elaborated with reference to FIG. 5.

Next, at 410, it may be determined if fuel and/or torque estimation has been requested. In one example, fuel and torque estimation may be requested once every firing period/event. In another example, fuel and torque estimation may be requested for engine fuel and torque control. If fuel and/or torque estimation is not requested, at 411, aircharge estimation based on the oxygen sensor output is not performed and the method returns to 408 to resume sampling the intake oxygen sensor at predefined even increments of time. In addition, the controller may continue to crank angle stamp each sample and store the samples in the buffer.

At 412, the method includes selecting one or more samples from the plurality of samples stored in the buffer and processing the selected samples to determine an aircharge estimate for fuel and torque control. As used herein, estimating the intake manifold aircharge includes estimating a net oxygen flow rate into engine cylinders. As elaborated with reference to FIG. 5, this includes looking back to samples corresponding to a last firing period and using those samples for aircharge estimation.

As detailed with reference to FIG. 3, using the oxygen sensor output for fuel and torque estimation includes, at 414, using the uncorrected/unadjusted oxygen sensor output for estimating an aircharge mass for fuel control. Further, at 416, the method includes using the diluent corrected/adjusted oxygen sensor output for estimating an aircharge mass for torque control. This includes reducing the unadjusted output of the intake oxygen sensor by a factor that is based on the concentration of fuel vapors received in the intake from EGR, purge, and/or crankcase ventilation.

The intake air oxygen sensor (IAO2) method may be particularly advantageous in systems that inject a gaseous fuel (such as CNG) into the engine, upstream of the throttle or upstream of the compressor (via port injection) while injecting some fuel such as gasoline or diesel because gaseous fuel may displace (hence dilute) a far greater portion of air than does port injection liquid fuel. In this way, by using the intake oxygen sensor as the primary air charge sensor, the engine fuel control is rendered insensitive to uncertainties in fueling induced by the presence of various diluents (such as fuel vapor hydrocarbons). In particular, the fueling that is estimated based on the air charge is the fueling that has not yet been injected (and therefore needs to be injected). Any fuel that is already injected (in the form of diluents and hydrocarbon vapors) is not accounted for in the air charge estimation for fuel control since it is not required to be added. By knowing the oxygen flow rate into engine cylinders, fueling errors introduced due to errors in EGR, humidity, purge, PCV and other diluents or hydrocarbons are reduced, making the fueling control significantly more accurate.

At 418, the method includes learning an adaptive fuel correction based on feedback from an air-fuel ratio sensor, such as an exhaust air-fuel ratio sensor. For example, the controller may learn an injector offset based on a deviation between the estimated air-fuel ratio and the expected air-fuel ratio. As an example, the air/fuel ratio error measured by the exhaust UEGO sensor may contain a fuel injector error and the N-density or MAF based airflow error. As such, the adaptive learning may also be performed with one or more of EGR, purge, and PCV hydrocarbons flowing into the intake air. For example, fuel system adaptation can be performed while running canister purge since the canister purge changes from a noise to signal with the use of the intake oxygen sensor.

Effectively, the adaptive fuel term may be configured as an integrator term added (or in some cases multiplied) to the desired fuel mass to drive the exhaust measure relative fuel air ratio to the desired value (e.g., to 1.000 which stoichiometric). The integrator may be condition specific. Example conditions may include engine speed, fuel injection pulsewidth, cylinder mass, engine load, and air flow rate. Thus, in one example, a separate integrator may be applied for higher air flow rates as compared to lower air flow rates. As such, the fueling error may reflect a fuel injector error and an airflow estimation error.

At 420, the method includes adjusting an engine operating parameter based on the aircharge estimate and learned offsets. This includes adjusting engine fueling based on the learned fuel injector offset, and further adjusting an engine torque actuator based on a learned airflow sensor offset. For example, the controller may adjust a fuel injection mass for an upcoming firing period based on the aircharge estimate and the fuel injector error. This includes determining a feed-forward fuel injection mass based on the aircharge estimate to achieve stoichiometry in the cylinder (that is, the air mass for fuel estimation determined based on the unadjusted output of the intake oxygen sensor) and feedback adjusting the fuel injection mass based on the learned injector offset/error. A fuel injector pulse width is them adjusted to provide the determined fuel injection mass. The desired fuel is then delivered by activating the fuel injector for a time required to deliver this fuel considering fuel temperature and pressure. The required activation time is provided by controlling the pulse width of the electrical signal driving the fuel injector.

The controller may also adjust one or more engine operating parameters based on the aircharge estimate for torque control. For example, the controller may adjust a throttle opening for an upcoming firing period based on the aircharge estimate and the MAF error. This includes determining a feed-forward throttle position based on the aircharge estimate (that is, the air mass for torque estimation determined based on the diluent-adjusted output of the intake oxygen sensor) and feedback adjusting the throttle position based on the learned MAF offset/error. Other engine operating parameters that may also be adjusted include an EGR valve position, intake and/or exhaust valve timing, boost pressure, or other suitable parameters. Further still a water injection amount may be adjusted to vary the amount of water used as diluent.

In this way, while flowing fuel vapors from a purge canister, a crankcase, and/or an EGR passage to an engine intake, an engine fueling is adjusted responsive to an unadjusted output of an intake oxygen sensor while an engine torque actuator is adjusted responsive to an adjusted output of the intake oxygen sensor, the adjusted output adjusted based on a concentration of the fuel vapors. Consequently, fuel and torque errors associated with intake air hydrocarbons and diluents can be mitigated. In particular, fuel system errors can be purely related to the injector's fueling errors and the total air mass flow rate estimation.

As described above, the system may be able to determine a more accurate estimate of the aircharge for each cylinder based on the output of the intake oxygen sensor, enabling the oxygen sensor to be used analogous to a MAP sensor. One conventional approach for processing the MAP signal requires the sensor to be sampled at twice the firing frequency in the angle domain, and then determining the aircharge estimate based on an average of the two samples. This is done to reduce pressure pulsation from the sensor signal. However, such an approach may require sensor sampling at very particular times, making the process computationally expensive with standard mechanisms of sensor signaling, e.g., generating an interrupt. To collect a signal from the sensor at specific times for each cylinder on each engine cycle entails an interruption of the controller and the cooperation of controller resources to constantly monitor the engine position. This approach may be impractical and/or expensive. In principle, sampling of the sensor at specific crankshaft angle increments may allow for the determination of MAP at the required times (e.g., at IVC). These angles are measured by Hall effect sensor 118, which is coupled to crankshaft 40. However, sampling of sensors at increments of the crankshaft angle may be resource-intensive and/or may be prone to error during transient events, such as when engine speed and hence crankshaft speed is increasing. A robust way to control an engine may be through the capacity to both sample and process engine parameters at even increments of the crankshaft angle. However, since such an approach is resource-intensive, the current disclosure accomplishes a similar task by sampling first (e.g. 1 millisecond intervals) and processing later (e.g., 240° or 120° increments on a 3 cylinder engine).

By sampling the intake oxygen sensor (operating now as a MAP sensor) at even increments of time, for example every millisecond, stamping each sample with the concurrent angle of the crankshaft, placing these results in a data buffer accessible to the controller, the controller may be able to handle and efficiently process the data. The aircharge may be computed based on an IAO2 sample, usually once per firing period (which is to say once per fueling request). Before calculating the aircharge prior to a fuel injection event, the controller may look through the angle stamps in the a buffer for the angle stamp, or set of stamps, to identify samples corresponding to the last firing period (that is, the immediately preceding firing period) and use the corresponding sensor data to compute the aircharge as described below with respect to FIGS. 3-4. This aircharge may be then used to compute the fuel injection amount. Once the fuel injection calculation has taken place, the buffer may be cleared to accept the next batch of angle-stamped IAO2 sensor readings in some examples. In other examples, the buffer may be a first in, first out buffer where each new sample (or set of samples) replaces the oldest sample in the buffer. The capacity of this buffer may be based on a slowest engine speed at which the system is predicted to operate. The slower the speed of an engine, the more angle-stamped pressure signals have to be stored in the buffer. In one specific example, in order to support the above-described sampling and storing of IAO2 signal samples once every millisecond at a lowest engine speed of 450 RPM, the buffer may have a capacity of 267 samples (e.g., in order to store each sample collected during an engine cycle of two crankshaft revolutions). The buffer may be proportionally smaller if only a fraction of samples from the full engine cycle are needed. For example, if only the samples from one cylinder event are needed in a four cylinder engine at 450 RPM, only 67 samples would be needed (60/450/2=67). Similarly, fewer samples may be needed when a slower sampling rate is used.

The above-described mechanism for calculating aircharge may be utilized in an engine where a liquid fuel is direct-injected typically injected after intake valve closing and/or where a gaseous fuel in port fuel injected prior to intake valve closing. The estimated aircharge may be used to compute the relative fuel-air ratio (also referred to as phi) of the intended fuel-air charge. This intended fuel-air charge may be compared to the actual fuel-air charge as determined from an exhaust gas sensor, such as the Universal Exhaust Gas Oxygen (UEGO) sensor. Future fueling corrections may be based on comparing the intended phi with the phi as inferred from the UEGO sensor. Since a direct injected engine typically injects a portion of its fuel after intake valve closing, fuel injection pulses after intake valve closing can adjust phi with a higher accuracy air charge measurement.

Figure 5:
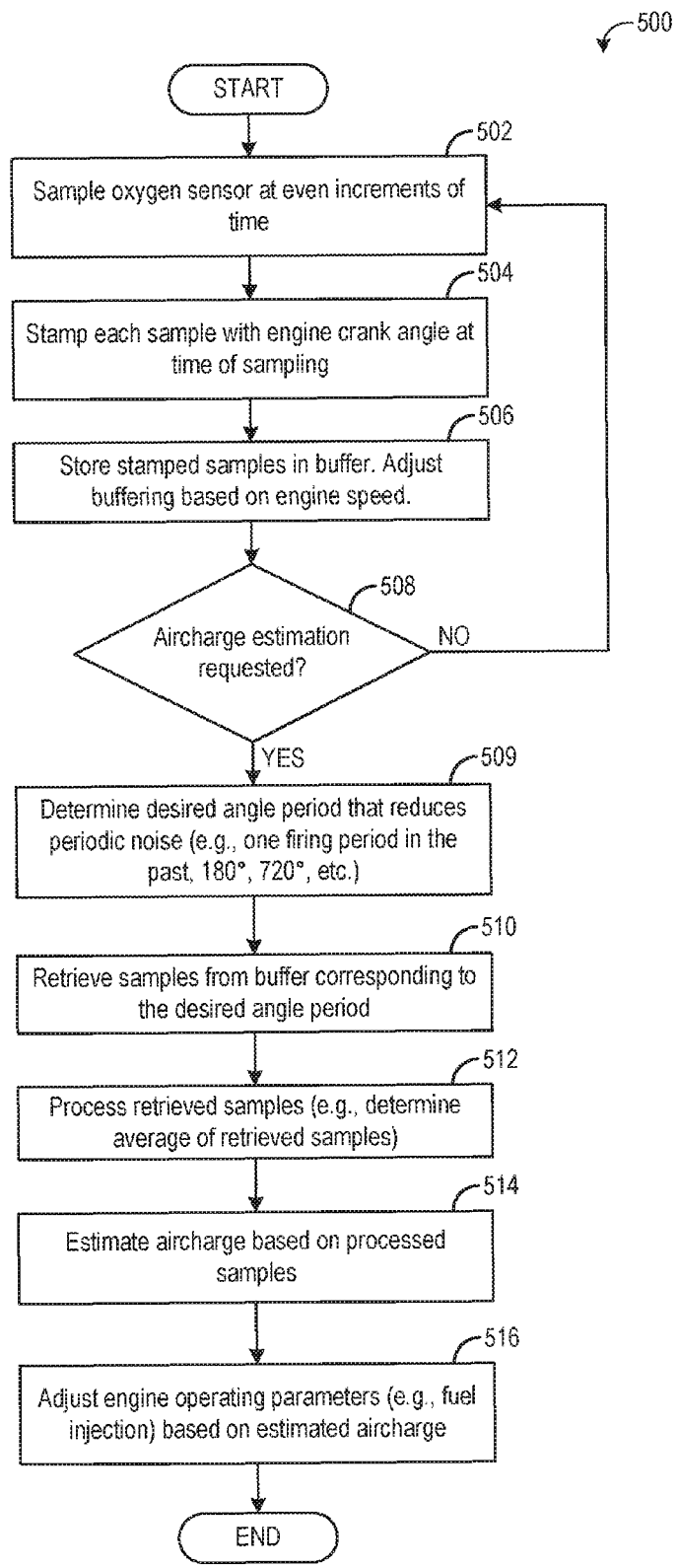
FIG. 5 shows a flow chart illustrating a method for processing the output of the intake oxygen sensor for at least engine fueling control.

Turning now to FIG. 5, the sampling, processing, and buffering of samples collected at the IAO2 sensor and used for aircharge estimation is described. It will be appreciated that the sampling, storing, and processing described below is performed while a diluent is flowing to the engine intake, such as while exhaust gas is recirculated from an exhaust passage to an intake passage of the engine.

The typical way of dealing with sensor noise is to use an analog filter to smooth the signal, sample that signal, and then perhaps further digitally filter the sample. Typically one ends up with one UEGO value per control period. As elaborated herein, by sampling at a high speed (e.g., 1000 Hz), buffering the signal, and then processing the buffered data at a slower speed (longer period), a higher quality signal can be attained than if the sampling was done only at the slower speed. One example includes computing the mean of the oxygen sensor samples over an angular displacement that is equal to 180° on a 4 cylinder engine. Doing so rejects almost all the noise correlated with engine firing/intake/exhaust events. Another example method includes selecting a particular angle at which to use the oxygen sensor signal, such as at Intake Valve Closing (IVC).

Method 500 includes, at 502, sampling intake oxygen sensor (IAO2) output at even increments of time. One example of such as a sampling is depicted at FIGS. 6 and 7. In one embodiment the IAO2 sensor sampling rate may be specified as one sensor reading every millisecond. In another embodiment the sampling rate may be at five-millisecond intervals. In still another example, the sampling may be performed at 1000 Hz. In other embodiments the sampling rate may be different or made to be adjustable within a specified range of sampling frequencies. It will be appreciated that the signal is not required to be sampled synchronous to engine speed. The fixed time increment sampling enables sampling to be performed with low overheads, such as by low level drivers of the engine's controller, in parallel to main engine controller processing events. In addition, the need for synchronous interrupts in the processor in reduced. Furthermore, the time incremented sampling frequency enables higher harmonics of firing frequency to be reduced.

At 504, the method includes stamping each sample with the engine crank angle at the time of sampling. The crankshaft angle may be measured by a Hall effect sensor (such as sensor 118 of FIG. 1). The value of the angle is used to stamp the signal from the IAO2 sensor. The connection between sampling instances and the concurrent determination of the corresponding crankshaft angle is depicted in FIG. 6, which will be explained in more detail below. In some examples, the sampling of IAO2 signals and their immediate stamping with their concurrent crank angles takes place as long as the engine is operating. In addition, the sampling and stamping occurs independent of diluent presence (that is, irrespective of whether EGR, purge, or PCV is flowing to the engine intake or not). Note that while the sensor sampling takes place at even time intervals, the rate at which the crank angles are detected depends on the speed of an engine. When an engine is operating at a higher speed, the rotation speed of the crankshaft is also higher. These dynamics are depicted in FIGS. 6 and 7 wherein for a given sampling frequency, a gap between angle stamps for consecutive samples varies with engine speed (due to variations in the time spent by a cylinder in compression stroke with change in engine speed). By sampling the sensor at even increments of time and angle stamping the samples, the need for interrupts, such as 1 degree or 6 degree angle interrupts is overcome.

In some examples, an alternative approach for determining the crank angle when an IAO2 sample is taken is to infer the crank angle based on the crank angle of the current interrupt and knowledge of the present engine angular velocity (e.g., engine speed). Effectively, this is a way to assign approximate crank angles to the IAO2 samples instead of using the higher accuracy angle data that originate from engine position sensing/extrapolation.

At 506, the angle-stamped IAO2 signals are stored in a buffer. This buffer may be within the memory of the controller, or in a component operably (e.g., communicatively) coupled to it. The number of angle-stamped samples that may be stored in this buffer depends on the speed of the engine. As noted above, the faster the speed of an engine is, the faster each cylinder stroke (corresponding to 180-degrees) will be traversed at the crankshaft. Since the IAO2 signals are sampled at pre-determined even increments of time, a fast engine will produce fewer angle-stamped signals than a slow engine during the same 180-degree crankshaft angle displacement. Thus, buffer capacity may be dictated by the lowest boundary of the speed range of an engine during engine operation, or by the lowest speed at which it is desired to support the sampling described herein. The maximum number of angle-stamped IAO2 signals that may be stored at a buffer may correspond to this lowest engine speed. By storing the stamped samples in a buffer, the need to process each sample is reduced, rendering the signal processing more compatible with existing PCM sampling and processing constructs.

Data stored in a buffer may follow one or more buffer-clearing protocols. In one embodiment, information pertaining to new angle-stamped signals will enter a buffer at the beginning of the buffer queue, displacing the oldest stored signal at the end of the queue. In another embodiment, the whole buffer may be cleared at the end of the firing sequence. In other embodiments, older angle-stamped IAO2 sensor signals from two or more previous firing strokes may be stored within a memory of the controller to produce a more accurate estimate of aircharge. Note that in this example the use of one buffer is described, but that in other embodiments each operating cylinder may be allocated its own buffer.

FIG. 7 shows an example of sampling and buffering sensor data at two different engine speeds at map 700. In one example, the lower engine speed samples were sampled while the engine was at 600 rpm while the higher engine speed samples were sampled while the engine was at 6000 rpm. In the present example, each plot shows how the buffers would look like at the two different engine speeds if a sine wave was being sampled. The samples are depicted by open circles on the sine wave. Buffers at incremental times of the sampling process are shown at Sampling_1, Sampling_2, and Sampling_3. As can be seen by comparing any given buffer at the higher and lower engine speed, a larger number of samples are captured and stored in the buffer at a given sampling time when the engine speed is lower than when the engine speed is higher.

At 508, the method includes determining if an aircharge estimation is requested. If no aircharge estimation is requested, method 500 returns to 502 to continue the sampling of IAO2 signals, followed by their angle-stamping and subsequent storage in a buffer, as described at 504 and 506, respectively. In one example, aircharge estimation may be requested prior to a fueling event, such as once every firing period. If at 508 it is determined that an aircharge estimation has been requested, method 500 proceeds to initiate the processing of the pertinent signals. It will be appreciated that while the present example describes the processing being performed responsive to a fueling request/aircharge estimation request, in alternate examples, the stamped and buffered IAO2 signals may be processed at even time-incremented intervals, such as once every firing period or once every 15 milliseconds.

At 509, the method includes determining a desired angle period (of the buffer) from which samples are to be retrieved. The desired angle period may be selected to reduce knock periodic noise and as such may vary based on the estimation queried at 508. The desired angle period may include a desired angle range. In the present example, where aircharge estimation is requested, the desired angle period may correspond to the last 180 degrees (since the request) in the buffer. In another example, the desired angle period may correspond to the last 720 degrees in the buffer. In still other examples, the desired angle period may be a single crank angle time instead of a time range. In one example, with reference to the sampling and buffering of FIG. 7, each buffer of map 700 depicts samples (open circles) collected and stored for a 180 degree period.

At 510, method 500 includes retrieving samples from the buffer corresponding to the desired angle period. For example the controller may retrieve two or more samples having a designated crank angle stamp. As one example, the controller may search through the buffer and retrieve samples from the buffer corresponding to the last 180 degrees since the aircharge estimation request was received. Based on the engine speed, the number of samples in the buffer corresponding to the last 180 degrees may vary (e.g., smaller number of samples for higher engine speeds and larger number of samples for lower engine speeds), as explained with reference to the sampling and buffering example of FIG. 7. Therein, the controller may determine the angle-stamped IAO2 signal(s) that match a designated crank angle, such as a crank angle that coincides with one firing period into the past (e.g., the last 180-degrees for a 4-cylinder engine). Therein, each sample in the buffer corresponding to the last 180 degrees is retrieved, which may amount to a larger number of samples if the engine speed in the last 180 degrees of sampling was lower, and a smaller number of samples if the engine speed in the last 180 degrees of sampling was higher. It will be appreciated that in alternate examples, the controller may search through the buffer and retrieve angle-stamped samples corresponding to an alternate positive integer number (n) of firing cycles into the past (that is, the last n times 180 degrees for a 4-cylinder engine, such as for 720 degrees). In still other examples, the controller may retrieve two or more samples corresponding to the firing frequency in the angle domain. In yet another example, the two or more of the processed sampled signals are selected once per firing period and include signals corresponding to an immediately previous firing period. Alternatively, the controller may take retrieve multiple samples corresponding to each cylinder event and use those samples for the appropriate cylinder event. Further still, the controller may retrieve a single sample from the desired period corresponding to a specific event in angle, such as intake valve closing (IVC).

Once selected, at 512, the method includes processing the selected samples. For example, the controller may determine an average of the retrieved samples, with the controller averaging the samples corresponding to one firing period into the past. This yields the average IAO2 signal over the last 180 degrees for a 4-cylinder engine with reference to the above-mentioned example. In an alternate example, the average may be a weighted or other statistical average. In still other examples, the controller may take multiple samples for each cylinder event and take the average of these signals and use it for the appropriate cylinder event.

At 514, the processed sample, for example the calculated average of the selected samples, may be used (directly) to estimate the aircharge for fuel control. Still other embodiments may use an extrapolation of angle-stamped IAO2 signals from two or more firing cycles into the past that are stored in the buffer, or an interpolation based on buffer-stored angle-stamped signals collected on the immediately previous firing cycle to estimate the intake aircharge. As described with reference to FIG. 4, the estimation includes determining an air mass corresponding to the determined average without correcting for the presence of diluents. This aircharge estimate can then be used for fuel control. Additionally, the controller may adjust the air mass corresponding to the determined average with a correction for the presence of diluents. This aircharge estimate can then be used for torque control.

The aircharge may be estimated using the air mass (or manifold air flow rate) estimated based on the average sensor output in combination with the volume of the cylinder to determine the cylinder trapped mass according to the ideal gas law pV=nRT. Alternatively, tables, controller and other algorithms correlating mass flow rate to cylinder aircharge or other suitable methods may be used to estimate aircharge. Once the aircharge has been computed, method 500 moves to 516 to adjust a selected engine operating parameter. This operating engine parameter may be the amount of fuel to be injected into the cylinder chamber, for example for the purpose of attaining a stoichiometric fuel to air ratio in the combustion chamber. However, other engine operating parameters may also be adjusted, such as EGR valve position, intake and/or exhaust valve timing, boost pressure, or other suitable parameter.

When the operating engine parameter is the amount of fuel to be injected into the cylinder chamber to achieve a desired torque while operating the air/fuel combusted in the cylinder at stoichiometry, the mass of air and recirculated exhaust gas entering the cylinder is first calculated using the speed density algorithm described above. The mass of recirculated gas is then calculated from a pressure difference across the EGR valve and subtracted from the air and exhaust gas entering the cylinder to provide the mass of fresh air entering the cylinder. The desired fuel is then calculated to achieve stoichiometry in the cylinder and the desired fuel is delivered by activating the fuel injector for a time required to deliver this fuel considering fuel temperature and pressure. The required activation time is provided by the pulse width of the electrical signal driving the fuel injector. Method 500 then exits.

As one example, cylinder air charge is computed once per cylinder event. That is, the cylinder aircharge is computed every 180° of crankshaft rotation for an even firing 4 cylinder engine. In one example, the IAO2 sensor is sampled at 1000 Hz and the samples are stored in a buffer. Each time from the controller needs an input from the IAO2 sensor, the input is obtained based on an average of the samples taken during the last 180°. This reduces noise that is correlated to firing events. Since engine speed varies, we need to "go back in time" or "go back in angle" a differing number of samples so as to retrieve a collection of samples over the last 180°. In the "go back in time" approach, the controller calculates how many milliseconds that it took to turn 180° at the present speed and uses that number of 1 millisecond samples. If the crank angle stamps are also available, the controller can optionally "go back in angle" instead of going back in time. Alternatively, the controller may use the angle stamped data to find (within the buffered samples) the IAO2 value at a specific event in angle, such as Intake Valve Closing (IVC).

It will be appreciated that while the method of FIGS. 4-5 are described with reference to signals from an intake oxygen sensor, the processing may be similarly applicable to signals from an exhaust gas (oxygen) sensor mounted in the engine exhaust stream. In addition, the processing may be extended to one or more other pressure (or partial pressure) sensors of the engine that have engine event correlated noise.

Operation of engine 10, particularly, the firing order, will be described now in reference to plot 600 of FIG. 6, which depicts ignition timing diagrams for the four cylinders of engine 10. For each diagram, cylinder number is shown on the y-axis and engine strokes are depicted on the x-axis. Further, ignition, and the corresponding combustion event, within each cylinder is represented by a star symbol between compression and power strokes within the cylinder. Engine 10 may be fired with the following firing order: 1-3-2-4 (or 2-4-1-3 or 3-2-4-1 or 4-1-3-2 since the firing is cyclic) at even intervals, e.g., one cylinder may be fired every 180° crank angle. The x-axis of each cylinder's ignition timing diagram is relative to engine crankshaft angles with the onset of CYL. 3's power stroke set as 0 degrees. Since all four cylinders are out of phase with respect to each other, an angle value of 0 corresponds to the onset of the compression cycle for CYL. 2, the intake cycle for CYL. 4 and the exhaust cycle for CYL. 1, respectively. Below the diagram for CYL. 3, there is an additional diagram 604 depicting angle stamped intake oxygen sensor signals that were sampled at even time increments. Based on the engine speed (plot 602) at which the samples were signaled, a crank angle spacing between the samples may be higher or lower. For example, the crank angle spacing between consecutive samples may be larger when the engine speed is lower, and the spacing may be smaller when the engine speed is higher. However, the collection schedule of these IAO2 samples takes place consistently, for example once every millisecond. The oxygen content that intake oxygen sensor 172 (of FIG. 1) detects at the intake manifold applies the same to all four cylinders.

The first stroke depicted in FIG. 6, starting at a crankshaft angle of 180 degrees, displays CYL. 2 traversing its compression stroke, at the end of which ignition takes place, as indicated by the star symbol. Concurrently, CYL. 4, CYL. 1, and CYL. 3 are traversing their intake, exhaust, and power strokes, respectively. This whole sequence is repeated as each cylinder progresses to the right in FIG. 6, toward the next appropriate stroke within its four-stroke cycle.

An aircharge estimation request is received once every firing period, as indicated at 610 and 612. In one example, the aircharge estimation request for a cylinder event coincides with an intake valve closing event of the given cylinder (e.g., of CYL. 3 at 610 and of CYL. 2 at 312). In some cases, the aircharge estimation request coincides with the sampling of the intake sensor, such as at 612. In other cases, they do not coincide, such as at 610.

As described above with respect to method 500, in response to the aircharge estimation request at 610, the controller may look back at samples in the buffer that are from one firing period back and select at least two samples that correspond to the last firing period and to the firing frequency. For example, the controller may select samples 620 and 630 (solid circles) while rejecting samples 618, 622, 624, and 626. The particular samples are selected based on the time when the air induction stroke happens. The sample selection may also be determined by the location of the intake oxygen sensor and the volume of the aircharge between the sensor and the inducting cylinder. Likewise, in response to the aircharge estimation request at 612, the controller may look back at samples in the buffer that are from one firing period back and select at least two samples that correspond to the last firing period and to the firing frequency. For example, the controller may select samples 640 and 646 (dashed circles) while rejecting samples 638 and 642.

In an alternate example, based on the aircharge estimation request at 610, the controller may retrieve all samples in the buffer that are from 180 degrees into the past, including samples 622, 624, 626, and 630 while rejecting samples 620, 618 and any preceding samples since they correspond to more than 180 degrees into the past. Aircharge may then be estimated based on an average of samples 622-630. Likewise, based on the aircharge estimation request at 612, the controller may retrieve all samples in the buffer that are from 180 degrees into the past, which only includes samples 642 and 646 while rejecting samples 640, 638 and any preceding samples since they correspond to more than 180 degrees into the past. Aircharge may then be estimated based on an average of samples 642 and 646.

In an alternate example, based on the angle stamp, the controller may look-up and identify the intake sensor sample that was taken closest MAP to, and before (but not after) IVC. This sample may then be used to calculate the aircharge.

In this way, cylinder aircharge estimation may be performed more accurately. By using the unadjusted output of the oxygen sensor for estimating an aircharge that is used for fuel control, engine fueling can be accurately controlled even in the presence of diluents. In addition, adaptive fuel learning can be performed while the diluents are flowing, enabling adaptive fuel learning to be completed more frequently over a drive cycle. An aircharge estimated this way contributes to a more efficient adjustment of an engine's operating parameters, such as the amount of fuel injection into a cylinder. The disclosed method samples intake oxygen sensor signals at even time intervals, stamps these signals with the concurrent angle of the crankshaft, and stores these signals in a buffer. The method further, when an aircharge is requested by an engine's system, searches the buffer in order to identify one or more samples from the last firing period that are synchronous with firing frequency. The identified samples are then used to directly estimate air for fuel control, even if a diluent such as EGR is flowing to the engine. The accurate aircharge estimate into a cylinder is then used for the purpose of adjusting an engine operating parameter, for example the amount of fuel injection into a cylinder. The technical effect of determining an aircharge by retrieving an angle-stamped intake oxygen sensor signal (or a plurality of signals) from a buffer is to estimate the cylinder aircharge more accurately in order to adjust engine fueling and torque.

One example method for an engine comprises: while flowing one or more diluents into an engine, adjusting engine fueling responsive to an output of an intake oxygen sensor independent of the diluents; and learning an adaptive fuel correction. In the preceding example, additionally or optionally, the one or more diluents include exhaust gas recirculation (EGR), purge fuel vapors, and crankcase ventilation fuel vapors, and wherein the intake oxygen sensor is coupled to an intake passage of the engine. In any or all of the preceding examples, additionally or optionally, adjusting the engine fueling independent of the diluents includes adjusting engine fueling based on an unadjusted output of the intake oxygen sensor. In any or all of the preceding examples, additionally or optionally, adjusting engine fueling includes estimating a cylinder aircharge based on an output of the intake oxygen sensor, without correcting the output for the diluents, and estimating engine fueling based on the estimated cylinder aircharge. In any or all of the preceding examples, additionally or optionally, adjusting engine fueling and learning an adaptive fuel correction includes feed-forward adjusting an engine fueling amount based on the output of the intake oxygen sensor and feedback adjusting the engine fueling amount based on air-fuel ratio estimated by an exhaust gas sensor. In any or all of the preceding examples, additionally or optionally, the method further comprises adjusting a fuel injector pulse-width based on the adjusted engine fueling amount. In any or all of the preceding examples, additionally or optionally, the method further comprises, while flowing the one or more diluents to the engine, learning an offset of one or more engine components including an intake manifold airflow sensor. In any or all of the preceding examples, additionally or optionally, the method further comprises correcting the output of the intake oxygen sensor for the diluents, and adjusting an engine actuator based on a cylinder torque estimated responsive to the corrected output. In any or all of the preceding examples, additionally or optionally, he correcting includes estimating a diluent concentration via a diluent sensor, and reducing the output of the intake oxygen sensor based on the diluent concentration. In any or all of the preceding examples, additionally or optionally, the output of the intake oxygen sensor includes a pumping current output upon application of a reference voltage to the sensor, the reference voltage including a voltage where water molecules do no dissociate at the sensor, the engine actuator adjusted including one or more of an intake throttle coupled to the intake passage and an EGR valve coupled to an EGR passage.

Another example method for an engine comprises: while flowing fuel vapors from one or more of a purge canister, a crankcase, and an exhaust gas recirculation passage to an engine intake, adjusting an engine fueling responsive an unadjusted output of an intake oxygen sensor; and adjusting an engine torque actuator responsive to an adjusted output of the sensor, the adjusted output adjusted based on a concentration of the fuel vapors. In the preceding example, additionally or optionally, the method further comprises learning a fuel injector offset during the flowing based on a combustion air-fuel ratio output by an exhaust gas sensor, learning a humidity offset during the flowing based on the intake oxygen sensor, and further adjusting the engine fueling based on the learned offsets. In any or all of the preceding examples, additionally or optionally, the unadjusted output of the intake oxygen sensor includes a pumping current output upon application of a reference voltage where water molecules do not dissociate, and wherein the adjusted output of the intake oxygen sensor includes the adjusted output reduced by a factor based on the concentration of the fuel vapors. In any or all of the preceding examples, additionally or optionally, the method further comprises sampling the intake oxygen sensor at even increments of time, storing each sampled signal in a buffer, processing the stored sampled signals in the buffer at even increments of engine crank angle, and estimating a cylinder intake aircharge based on one or more of the processed sampled signals. In any or all of the preceding examples, additionally or optionally, the one or more of the processed sampled signals include signals corresponding to an immediately previous firing period.

Another example system comprises an engine having a cylinder supplied with intake air from an intake passage; an oxygen sensor coupled to the intake passage; an EGR passage for recirculating exhaust gas from an exhaust passage to the intake passage, the EGR passage including an EGR valve and an EGR sensor; an exhaust gas sensor coupled to the exhaust passage; a direct fuel injector for injecting fuel into the cylinder; and a controller. The controller may be configured with computer readable instructions stored on non-transitory memory for: while recirculating exhaust gas to the intake passage, sampling a signal from the oxygen sensor at a predetermined sampling rate; for each sample, stamping the sample with a corresponding engine crank angle; storing each stamped sample in a buffer; and responsive to a request to inject fuel into the cylinder, retrieving at least two samples from the buffer having a crank angle stamp corresponding to a firing period immediately preceding the request; calculating an aircharge estimate for the cylinder based on an average of the retrieved at least two samples; determining a fuel injection amount based on the calculated aircharge estimate; correcting the fuel injection amount based on a learned fuel injector error; and commanding a pulse width to the fuel injector based on the corrected fuel injection amount. In the preceding example, additionally or optionally, the direct fuel injector is configured to inject a first, liquid fuel into the cylinder, the system further comprising a port fuel injector for injecting a second, gaseous fuel into an intake port of the cylinder. In any or all of the preceding examples, additionally or optionally, the fuel injection amount based on the calculated aircharge estimate is independent of an EGR concentration, and wherein the controller includes further instructions for correcting the aircharge estimate responsive to the EGR concentration, the EGR concentration based on the EGR sensor; and adjusting one or more engine torque actuators based on the corrected aircharge estimate, the one or more engine torque actuators including the EGR valve. In any or all of the preceding examples, additionally or optionally, the controller includes further instructions for adaptively learning the fuel injector error based on an output of the exhaust gas sensor while recirculating the exhaust gas to the intake passage. In any or all of the preceding examples, additionally or optionally, sampling the signal from the oxygen sensor includes applying a reference voltage where water molecules do not dissociate to the oxygen sensor and sampling a pumping current output upon application of the reference voltage.

Yet another example method for an engine comprises: sampling an intake oxygen sensor signal at even increments of time; storing each sampled signal in a buffer; processing the stored sampled signals in the buffer at even increments of engine crank angle; and adjusting an engine operating parameter based on a selected two or more of the processed sampled signals. In the preceding example, additionally or optionally, adjusting an engine operating parameter based on a selected two or more of the processed sampled signals comprises adjusting a fuel injection amount based on an average of the selected two or more of the processed sampled signals. In any or all of the preceding examples, additionally or optionally, processing the stored sampled signals in the buffer at even increments of engine crank angle comprises processing the stored sampled signals at an engine firing frequency. In any or all of the preceding examples, additionally or optionally, the method further comprises, prior to storing each sampled signal in the buffer, stamping each sampled signal with an engine crank angle stamp that corresponds to an engine crank angle at a time the sampled signal was sampled. In any or all of the preceding examples, additionally or optionally, the processing is performed once every engine firing event, and wherein processing the stored sampled signals in the buffer at even increments of engine crank angle comprises: at a firing event for a given cylinder, selecting at least two sampled signals from the buffer having an engine crank angle stamp that corresponds to an engine crank angle for an immediately previous firing event (of the given cylinder); processing the selected sampled signals to estimate intake manifold aircharge; and wherein adjusting the fuel injection amount comprises adjusting the fuel injection amount based on the estimated intake manifold aircharge. In any or all of the preceding examples, additionally or optionally, estimating the intake manifold aircharge includes estimating a net oxygen flow rate into engine cylinders. In any or all of the preceding examples, additionally or optionally, the intake oxygen sensor is coupled to an engine intake passage, and wherein the sampling, storing, and processing is performed while recirculating exhaust gas from an exhaust passage to the intake passage. In any or all of the preceding examples, additionally or optionally, the method further comprises correcting the fuel injection amount responsive to a fuel injector error learned based on an exhaust air-fuel ratio sensor, fuel injector error learned while recirculating the exhaust gas; and adjusting a fuel injector pulse-width to inject fuel at the corrected fuel injection amount to a given cylinder. In any or all of the preceding examples, additionally or optionally, the method further comprises correcting the estimated intake manifold aircharge based on a hydrocarbon concentration of the recirculating exhaust gas, and adjusting an engine torque actuator based on the corrected intake manifold aircharge. In any or all of the preceding examples, additionally or optionally, the hydrocarbon concentration of the recirculating exhaust gas is estimated by an air-fuel ratio sensor coupled to an EGR passage, and wherein the engine torque actuator includes an EGR valve coupled to the EGR passage.

Another example method for an engine comprises: sampling an intake manifold oxygen sensor signal at predetermined time intervals to generate a data set including a plurality of samples; stamping each sample of the data set with an engine crank angle; and in response to a fuel injection request, adjusting fuel injection based on an intake aircharge amount estimated based on a selected two or more samples of the data set, the selected two or more samples having an engine crank angle stamp corresponding to one firing period immediately preceding the fuel injection request. In the preceding example, additionally or optionally, the fuel injection request comprises a fuel injection request for a given cylinder of the engine, and wherein at least one of the selected two or more samples has a crank angle stamp that is closest to a designated engine crank angle relative to all other samples in the data set, the designated engine crank angle corresponding to an intake valve closing event for the given cylinder. In any or all of the preceding examples, additionally or optionally, stamping each sample of the data set with an engine crank angle comprises, for a given sample, retrieving a crank angle of the engine at a point in time when the given sample was sampled and stamping the given sample with the retrieved crank angle. In any or all of the preceding examples, additionally or optionally, the method further comprises storing the data set in a buffer of a memory of a controller operably coupled to the intake oxygen sensor. In any or all of the preceding examples, additionally or optionally, the method further comprises after adjusting the fuel injection based on the intake aircharge amount estimated based on the selected two or more samples, discarding remaining samples of the data set from the buffer.

Still another example system comprises: an engine having a cylinder supplied with intake air from an intake passage; an oxygen sensor coupled to the intake passage; a fuel system including a fuel tank coupled to a canister for storing fuel vapors, a purge passage for purging canister fuel vapors to the intake passage, and a purge valve coupled to the purge passage; an exhaust gas sensor coupled to an exhaust passage; a direct fuel injector for injecting fuel into the cylinder; and a controller. The controller may be configured with computer readable instructions stored on non-transitory memory for: while purging fuel vapors from the canister to the intake passage, sampling a signal from the oxygen sensor at a predetermined sampling rate; for each sample, stamping the sample with a corresponding engine crank angle; storing each stamped sample in a buffer; and responsive to a request to inject fuel into the cylinder, retrieving at least two samples from the buffer having a crank angle stamp corresponding to a firing period immediately preceding the request; calculating an aircharge estimate for the cylinder based on an average of the retrieved at least two samples; determining a fuel injection amount based on the calculated aircharge estimate; correcting the fuel injection amount based on a learned fuel injector error; and commanding a pulse width to the fuel injector based on the corrected fuel injection amount. In the preceding example, additionally or optionally, the direct fuel injector is configured to inject a first, liquid fuel into the cylinder, the system further comprising a port fuel injector for injecting a second, gaseous fuel into an intake port of the cylinder. In any or all of the preceding examples, additionally or optionally, the fuel injection amount based on the calculated aircharge estimate is independent of a purge fuel vapor concentration, and wherein the controller includes further instructions for: correcting the aircharge estimate responsive to the purge fuel vapor concentration, the purge fuel concentration based on a purge sensor coupled to the purge passage; and adjusting one or more engine torque actuators based on the corrected aircharge estimate, the one or more engine torque actuators including the purge valve. In any or all of the preceding examples, additionally or optionally, the controller includes further instructions for adaptively learning the fuel injector error based on an output of the exhaust gas sensor while purging the canister fuel vapors to the intake passage. In any or all of the preceding examples, additionally or optionally, sampling the signal from the oxygen sensor includes applying a reference voltage where water molecules do not dissociate to the oxygen sensor and sampling a pumping current output upon application of the reference voltage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method for controlling an engine, comprising:
while flowing fuel vapors from one or more of a purge canister, a crankcase, and an exhaust gas recirculation passage to an engine intake,
adjusting, via a controller, an engine fueling via an injector responsive to an unadjusted oxygen output of an intake oxygen sensor, the controller determining a concentration of the fuel vapors; and
adjusting, via the controller, an engine torque actuator responsive to an adjusted output of the sensor, the adjusted output adjusted based on the concentration of the fuel vapors.
2. The method of claim 1, further comprising learning a fuel injector offset during the flowing based on a combustion air-fuel ratio output by an exhaust gas sensor, learning a humidity offset during the flowing based on the intake oxygen sensor, and further adjusting the engine fueling based on the learned offsets.
3. The method of claim 1, wherein the unadjusted oxygen output of the intake oxygen sensor includes a pumping current output upon application of a reference voltage where water molecules do not dissociate, and wherein the adjusted output of the intake oxygen sensor includes the adjusted output reduced by a factor based on the concentration of the fuel vapors.
4. The method of claim 1, further comprising sampling the intake oxygen sensor at even increments of time, storing each sampled signal in a buffer, processing the stored sampled signals in the buffer at even increments of engine crank angle, and estimating a cylinder intake aircharge based on one or more of the processed sampled signals.

5. The method of claim 4, wherein the one or more of the processed sampled signals include signals corresponding to an immediately previous firing period.

* * * * *